United States Patent
Li et al.

(10) Patent No.: US 8,907,636 B2
(45) Date of Patent: Dec. 9, 2014

(54) METHOD AND DEVICE FOR PRIMARY FREQUENCY REGULATION BASED ON BANG-BANG CONTROL

(71) Applicants: State Grid Corporation of China, Beijing (CN); North China Electric Power Research Institute Co. Ltd., Beijing (CN)

(72) Inventors: Weihua Li, Beijing (CN); Zhenyong Yang, Beijing (CN); Aiguo Gao, Beijing (CN); Yi Luo, Beijing (CN); Liankun Lai, Beijing (CN); Feiyi Li, Beijing (CN); Yanjin Wang, Beijing (CN)

(73) Assignees: North China Electric Power Research Institute Co. Ltd., Beijing (CN); State Grid Corporation of China, Beijing (CN)

( * ) Notice: Subject to any disclaimer, the term of this patent is extended or adjusted under 35 U.S.C. 154(b) by 67 days.

(21) Appl. No.: 13/866,331

(22) Filed: Apr. 19, 2013

(65) Prior Publication Data

US 2014/0145452 A1    May 29, 2014

(30) Foreign Application Priority Data

Apr. 20, 2012  (CN) .......................... 2012 1 0118489

(51) Int. Cl.
| | | |
|---|---|---|
| H02P 11/00 | (2006.01) | |
| H02H 7/06 | (2006.01) | |
| H02P 9/00 | (2006.01) | |
| F03D 9/00 | (2006.01) | |
| H02P 9/04 | (2006.01) | |

(52) U.S. Cl.
CPC ......................................... H02P 9/04 (2013.01)
USPC ................. 322/29; 290/44; 700/297

(58) Field of Classification Search
USPC ................................. 322/29; 290/44; 700/297
See application file for complete search history.

(56) References Cited

U.S. PATENT DOCUMENTS

| | | | |
|---|---|---|---|
| 6,668,200 B2* | 12/2003 | Yasui et al. ..................... 700/28 |
| 7,050,864 B2* | 5/2006 | Yasui et al. ..................... 700/31 |
| 7,216,006 B2* | 5/2007 | Yasui et al. ..................... 700/54 |
| 7,957,884 B2* | 6/2011 | Wakashiro et al. ............. 701/93 |
| 8,219,256 B2* | 7/2012 | Nelson et al. .................. 700/287 |
| 2003/0009240 A1* | 1/2003 | Yasui et al. ..................... 700/40 |
| 2003/0028264 A1* | 2/2003 | Yasui et al. ..................... 700/29 |
| 2003/0120360 A1* | 6/2003 | Yasui et al. ..................... 700/29 |
| 2006/0129250 A1* | 6/2006 | Yasui et al. ..................... 700/19 |
| 2010/0138070 A1* | 6/2010 | Beaudoin ....................... 700/297 |
| 2011/0012352 A1* | 1/2011 | Nelson et al. ................... 290/44 |
| 2011/0217935 A1* | 9/2011 | Shen .......................... 455/67.11 |
| 2013/0216240 A1* | 8/2013 | Fukuchi ....................... 398/208 |
| 2014/0213312 A1* | 7/2014 | Yeh et al. ...................... 455/509 |

* cited by examiner

Primary Examiner — Pedro J Cuevas
(74) Attorney, Agent, or Firm — Weaver Austin Villeneuve & Sampson LLP (57) ABSTRACT

The present invention provides a method and a device for primary frequency regulation based on bang-bang control, the method comprises: obtaining in real-time a power grid frequency of a steam turbine generator set; performing a subtraction operation on a rated power grid frequency and said power grid frequency to generate a power grid frequency difference; performing a dead zone process on the power grid frequency difference according to a dead zone fixed value to generate a frequency difference; performing a frequency difference compensation operation on the frequency difference to generate a frequency difference compensation instruction; and combining an original primary frequency regulation output instruction with the frequency difference compensation instruction and outputting the result to a steam turbine speed regulation system when a selecting switch is 1.

14 Claims, 6 Drawing Sheets

METHOD AND DEVICE FOR PRIMARY FREQUENCY REGULATION BASED ON BANG-BANG CONTROL

FIELD OF THE INVENTION

The present invention relates to primary frequency regulation technology associated with power grid, and more particularly, to a method and a device for primary frequency regulation based on bang-bang control.

BACKGROUND OF THE INVENTION

Primary frequency regulation is an important means for frequency regulation of power grid. After the power grid frequency exceeds a preset dead zone, the steam turbine generator set releases boiler-stored heat via a fast-action regulating valve to change the mechanical work, to thereby change the mode of the active power.

Generally, there are two factors that decide the primary frequency regulation performance of a generator set: one is frequency regulation energy storage, and the other is fast release. If the generator set has sufficient energy storage, the exclusive factor deciding the fastness criteria (such as response time, rising time, etc.) of primary frequency regulation of the generator set is for the executing mechanism to fast release the energy storage.

Figure 1:
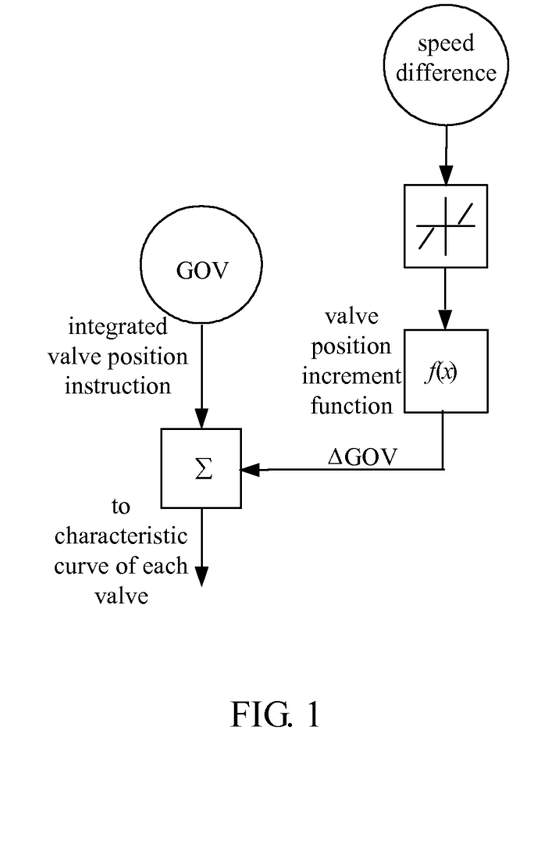
FIG. 1 is a schematic diagram illustrating a primary frequency regulation design circuit at the DEH side in the prior art.

In the prior art, primary frequency regulation of a thermal generator set is usually designed by the following principles: (1) Designing requirements at the digital electric hydraulic control system (DEH) side: a designing process is employed whereby a speed difference signal is directly superimposed at the speed regulation valve instruction of a steam turbine (combustion engine) via a speed governing droop design function. Simultaneously, the power instruction of the DEH power circuit also compensates a frequency regulation power fixed value according to a speed governing droop design criteria, and the compensated frequency regulation power fixed value is not restricted by the speed, as shown in FIG. 1. (2) Requirements at the coordination control system (CCS) side: a generator set employing distribution control system (DCS) and having coordination control and AGC functions completes the primary frequency regulation function by DEH together with CCS; a designing process is employed at the DEH side whereby a speed difference signal is directly superimposed at the speed regulation valve instruction of a steam turbine (combustion engine) via a speed governing droop design function, while a frequency correcting circuit is designed in the CCS, and the correction instruction in the CCS is not restricted by the speed, as shown in FIG. 2.

By virtue of the aforementioned design, it is possible for the thermal generator set to achieve fastness of primary frequency regulation through the functions at the DEH side, and achieve constancy of primary frequency regulation through the design at the CCS side.

Figure 2:
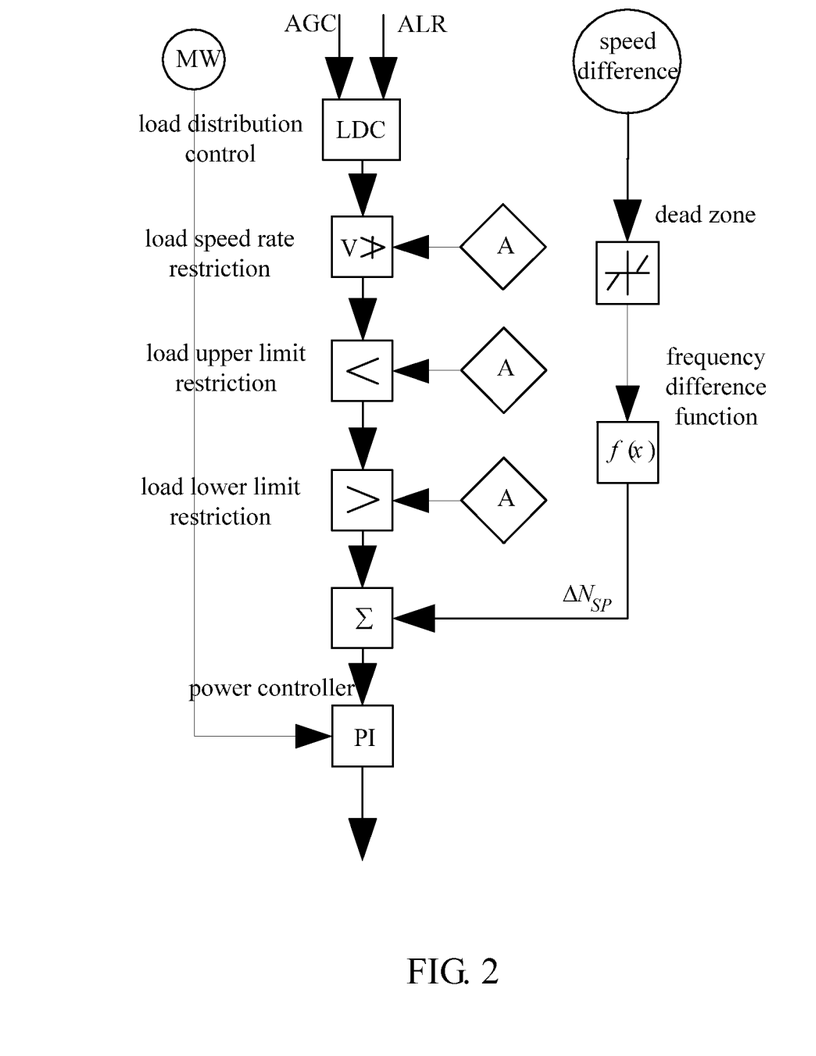
FIG. 2 is a schematic diagram illustrating a primary frequency regulation design circuit at the CCS side in the prior art.

Although the primary frequency regulation function of a generator set is achieved in the typical designs shown in FIGS. 1 and 2, when the grid frequency slightly fluctuates, energy storage of the generator set usually cannot be effectively released because the action of the executor is extremely small or because there is dead zone of the action, and the design and assessment criteria of primary frequency regulation hence cannot be achieved, the typical solution fails to take into consideration the influence of slight fluctuation of the grid frequency against the realization of the primary frequency regulation function of the generator set.

SUMMARY OF THE INVENTION

The present invention provides a method and a system for primary frequency regulation based on bang-bang control, so as to enhance the primary frequency regulation performance of a generator set under slight grid frequency fluctuation, and to effectively overcome the dead zone of the executing mechanism of the generator set.

In order to achieve the above objects, the present invention provides a method for primary frequency regulation based on bang-bang control, the method comprises: obtaining in real-time a power grid frequency of a steam turbine generator set; performing a subtraction operation on a rated power grid frequency and said power grid frequency to generate a power grid frequency difference; performing a dead zone process on the power grid frequency difference according to a dead zone fixed value to generate a frequency difference; performing a frequency difference compensation operation on the frequency difference to generate a frequency difference compensation instruction; and when a selecting switch is 1, combining an original primary frequency regulation output instruction with the frequency difference compensation instruction and outputting the result to a steam turbine speed regulation system.

Further, the step of performing a dead zone process on the power grid frequency difference according to a dead zone fixed value comprises: adding the power grid frequency difference to the dead zone fixed value or subtracting the dead zone fixed value from the power grid frequency difference to generate a frequency difference.

Further, the step of performing a frequency difference compensation operation on the frequency difference comprises: performing a primary frequency regulation test under a specific frequency difference disturbance in conditions of different rated loads to obtain a correspondence relationship curve between the frequency difference compensation instruction and the frequency difference disturbance; and obtaining a frequency difference compensation instruction to which the frequency difference corresponds according to the correspondence relationship curve.

Further, the selecting switch being 1 comprises: the power grid frequency is smaller than a difference between a rated frequency and a dead zone frequency or greater than a sum of the rated frequency and the dead zone frequency, and a delay exceeds a delay fixed value.

Further, if the selecting switch is 0, only the original primary frequency regulation output instruction is output to the steam turbine speed regulation system.

In order to achieve the above objects, the present invention further provides a device for primary frequency regulation based on bang-bang control, the device comprises: a frequency obtaining unit configured to obtain in real-time a power grid frequency of a steam turbine generator set; a power grid frequency difference generating unit configured to perform a subtraction operation on a rated power grid frequency and said power grid frequency to generate a power grid frequency difference; a dead zone processing unit configured to perform a dead zone process on the power grid frequency difference according to a dead zone fixed value to generate a frequency difference; a compensation instruction generating unit configured to perform a frequency difference compensation operation on the frequency difference to generate a frequency difference compensation instruction; and a frequency regulation action instruction outputting unit configured to, when a selecting switch is 1, combine an original primary frequency regulation output instruction with the frequency difference compensation instruction and output the result to a steam turbine speed regulation system.

Further, the dead zone processing unit is specifically used for adding the power grid frequency difference to the dead zone fixed value or subtracting the dead zone fixed value from the power grid frequency difference to generate a frequency difference.

Further, the compensation instruction generating unit comprises: a frequency regulation testing module configured to perform a primary frequency regulation test under a specific frequency difference disturbance in conditions of different rated loads to obtain a correspondence relationship curve between the frequency difference compensation instruction and the frequency difference disturbance; and a frequency difference compensation instruction generating module configured to obtain a frequency difference compensation instruction to which the frequency difference corresponds according to the correspondence relationship curve.

Further, the selecting switch being 1 comprises: the power grid frequency is smaller than a difference between a rated frequency and a dead zone frequency or greater than a sum of the rated frequency and the dead zone frequency, and a delay exceeds a delay fixed value.

Further, if the selector switch is 0, the frequency regulation action instruction outputting unit outputs only the original primary frequency regulation output instruction to the steam turbine speed regulation system.

Advantageous effects of the embodiments of the present invention are described as follows: a secondary fast release of energy storage of the generator set can be performed in the present invention, whereby it is not only possible to improve the primary frequency regulation performance of the generator set under slight grid frequency fluctuation, but also possible to effectively overcome the dead zone of the executing mechanism of the generator set without generating much additional action instructions to the generator set, and a prediction control of the generator set in participating the primary frequency regulation under slight grid frequency disturbance is realized. Moreover, the present invention requires no additional equipment for realization, as it can be completed merely based on the DCS control platform of the generator set, has stronger operability and control safety, and facilitates popularized use thereof.

BRIEF DESCRIPTION OF THE DRAWINGS

In order to more clearly describe the technical solutions of the embodiments of the present invention or the prior art, the drawings, which are needed to be used in the descriptions of the embodiments or the prior art, are briefly introduced as follows. Obviously, the drawings described hereinafter just illustrate some embodiments of the present invention, and a person skilled in the art can obtain other drawings based on these drawings without paying a creative effort. In the drawings.

DETAILED DESCRIPTION OF THE EMBODIMENTS

To make more apparent and clear the objects, technical solutions and advantages of the embodiments of the present invention, embodiments of the present invention will be described in greater detail below with reference to the drawings. The exemplary embodiments of the present invention and the descriptions thereof are merely meant to explain the present invention, rather than to restrict the present invention.

Figure 3:
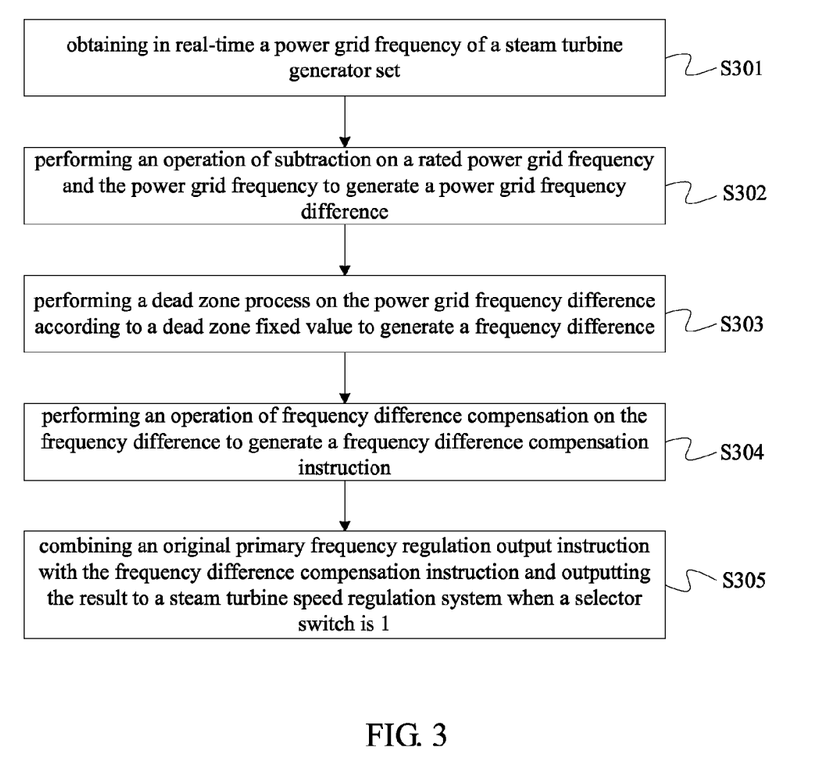
FIG. 3 is a flowchart illustrating a method for primary frequency regulation based on bang-bang control according to an embodiment of the present invention.

As shown in FIG. 3, an embodiment provides a method for primary frequency regulation based on bang-bang control, and the method comprises the following steps.

Step S301: obtaining in real-time a power grid frequency of a steam turbine generator set 13.

Figure 4:
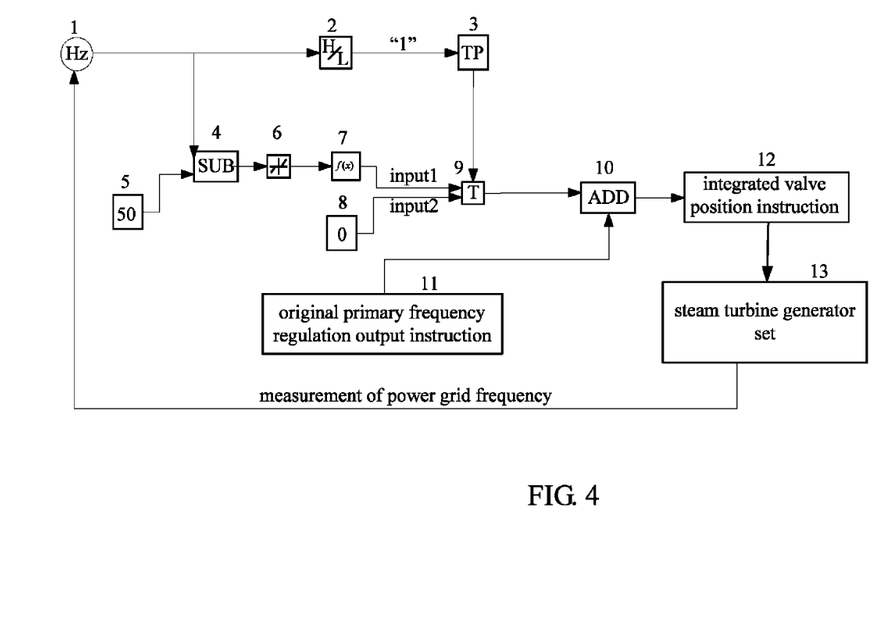
FIG. 4 is a schematic diagram illustrating a primary frequency regulation optimization circuit based on bang-bang control according to an embodiment of the present invention.

When there is slight fluctuation of grid frequency, in order to effectively release energy storage of the generator set, the present invention bases on FIG. 1 to add a primary frequency regulation optimization circuit based on bang-bang control, as shown in FIG. 4. To FIG. 4 are added functional block 1 to functional block 9 (totally 9 functional blocks) on the basis of the original adder 10, original primary frequency regulation output instruction 11, integrated valve position instruction 12 and steam turbine generator set 13 to together constitute the primary frequency regulation optimization circuit based on bang-bang control. The functional block 1 collects the power grid frequency signal (this may as well be a speed signal of the steam turbine), while the present application merely takes the power grid frequency signal for explanation, and this is not meant to restrict the present invention.

Step S302: performing a subtraction operation on a rated power grid frequency and the power grid frequency to generate a power grid frequency difference. As shown in FIG. 4, the functional block 5 is a fixed value module that provides a rated power grid frequency with a fixed value of 50 Hz for input into the functional block 4. The functional block 4 is a subtractor that performs a subtraction operation on the power grid frequency and the rated power grid frequency (50 Hz) to generate a power grid frequency difference.

Step S303: performing a dead zone process on the power grid frequency difference according to a dead zone fixed value to generate a frequency difference. As shown in FIG. 4, the functional block 6 is a dead zone processing module capable of performing a dead zone process on the received power grid frequency difference by using a dead zone fixed value, the dead zone fixed value is ±0.33 Hz. The power grid frequency difference value generated in Step S302 is output to the functional block 6 to undergo the dead zone process, and the dead zone fixed value is added to or subtracted from the power grid frequency difference to generate a frequency difference.

Step S304: performing a frequency difference compensation operation on the frequency difference to generate a frequency difference compensation instruction.

As shown in FIG. 4, the functional block 7 is a frequency difference compensation function f(x), which can be experimentally set; a primary frequency regulation test is performed under a specific frequency difference disturbance in conditions of different rated loads to obtain a correspondence relationship curve between the frequency difference compensation instruction and the frequency difference disturbance, and a frequency difference compensation instruction, to which the frequency difference corresponds, is obtained according to the correspondence relationship curve. An example is taken below to explain how the frequency difference compensation function f(x) is experimentally set.

When the generator set normally operates, primary frequency regulation tests are performed under frequency difference disturbances of 0.017 Hz and 0.008 Hz at 50% of the rated load, 60% of the rated load, 70% of the rated load, 80% of the rated load, 90% of the rated load, and 100% of the rated load, respectively, and a correspondence relationship between the compensation instruction and the frequency difference is obtained according to the primary frequency regulation action loads, as shown in Table 1.

TABLE 1

| Frequency Difference Hz | −0.017 | −0.008 | 0.008 | 0.017 |
|---|---|---|---|---|
| Compensation Instruction (%) | 1.2 | 0.8 | −0.8 | −1.2 |

Figure 5:
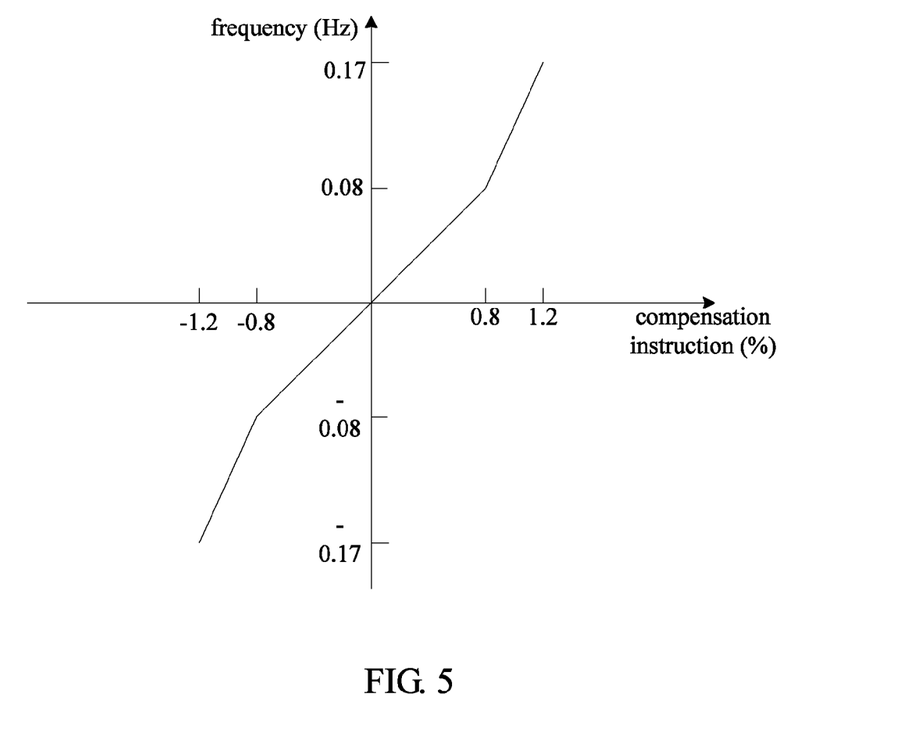
FIG. 5 is a relationship schematic diagram illustrating a frequency difference compensation function f(x) according to an embodiment of the present invention.

The frequency difference compensation function f(x) can be drawn from the correspondence relationship between the compensation instruction and the frequency difference obtained according to Table 1, as shown in FIG. 5.

The frequency difference obtained through the dead zone process is input to the functional block 7, and a frequency difference compensation instruction, to which the frequency difference corresponds, can be obtained according to the correspondence relationship curve.

Step S305: when a selecting switch is 1, combining an original primary frequency regulation output instruction with the frequency difference compensation instruction and outputting the result to a steam turbine speed regulation system.

The selecting switch being 1 comprises: the power grid frequency is smaller than a difference between a rated frequency and a dead zone frequency or greater than a sum of the rated frequency and the dead zone frequency, and a delay exceeds a delay fixed value. Referring again to FIG. 4, the functional block 2 is a high/low value selector, a high value of the high/low value selector is 50.033 Hz, and a low value of the high/low value selector is 49.976 Hz. The power grid frequency signal in the functional block 1 should be input to the high/low value selector; when the grid frequency signal is greater than 50.033 Hz or smaller than 49.976 Hz, the functional block 2 outputs a logic value "1" to the functional block 3, and otherwise outputs a logic value "0" to the functional block 3.

The functional block 3 is a delay output device, whose delay fixed value is set according to dynamic characteristics of the power grid, and the present invention sets the value as 15s according to the rising time value of the power grid frequency under the actual dynamic test condition of the power grid. The output of the functional block 3 serves as a selecting switch of the functional block 9. After the functional block 3 receives the logic value "1" received by the functional block 2, if the delay exceeds 15s, the selecting switch is "1", and otherwise the selecting switch is "0".

The functional block 9 is a selective output device that selects to output "input 1" when the selecting switch is "1", and outputs the frequency difference compensation instruction to the adder 10. When the selecting switch is "0", the functional block 9 selects to output "input 2" and outputs the fixed value "0" of the fixed value module 8 to the adder 10, namely only outputs the original primary frequency regulation output instruction to the steam turbine speed regulation system.

Figure 6:
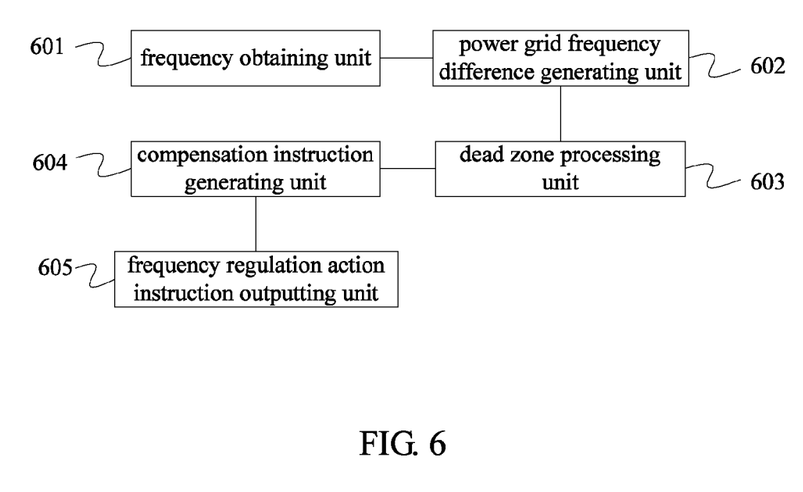
FIG. 6 is a schematic diagram illustrating a structure of a device for primary frequency regulation based on bang-bang control according to an embodiment of the present invention.

As shown in FIG. 6, this embodiment provides a device for primary frequency regulation based on bang-bang control, and the device comprises: a frequency obtaining unit 601, a power grid frequency difference generating unit 602, a dead zone processing unit 603, a compensation instruction generating unit 604, and a frequency regulation action instruction outputting unit 605.

The frequency obtaining unit 601 is configured to obtain in real-time a power grid frequency of a steam turbine generator set. When there is slight fluctuation of grid frequency, in order to effectively release energy storage of the generator set, the present invention bases on FIG. 1 to add a primary frequency regulation optimization circuit based on bang-bang control, as shown in FIG. 4. To FIG. 4 are added functional block 1 to functional block 9 (totally 9 functional blocks) on the basis of the original adder 10, original primary frequency regulation output instruction 11, integrated valve position instruction 12 and steam turbine generator set 13 to together constitute the primary frequency regulation optimization circuit based on bang-bang control. The functional block 1 collects the power grid frequency signal (this may as well be a speed signal of the steam turbine), while the present application merely takes the power grid frequency signal for explanation, and this is not meant to restrict the present invention.

The power grid frequency difference generating unit 602 is configured to perform a subtraction operation on a rated power grid frequency and said power grid frequency to generate a power grid frequency difference. As shown in FIG. 4, the functional block 5 is a fixed value module that provides a rated power grid frequency with a fixed value of 50 Hz for input to the functional block 4. The functional block 4 is a subtractor that performs a subtraction operation on the power grid frequency and the rated power grid frequency (50 Hz) to generate a power grid frequency difference.

The dead zone processing unit 603 is configured to perform a dead zone process on the power grid frequency difference according to a dead zone fixed value to generate a frequency difference. As shown in FIG. 4, the functional block 6 is a dead zone processing module capable of performing a dead zone process on the received power grid frequency difference by using a dead zone fixed value, the dead zone fixed value is ±0.33 Hz. The power grid frequency difference value generated in Step S302 is output to the functional block 6 to undergo the dead zone process, and the dead zone fixed value is added to or subtracted from the power grid frequency difference to generate a frequency difference.

Figure 7:
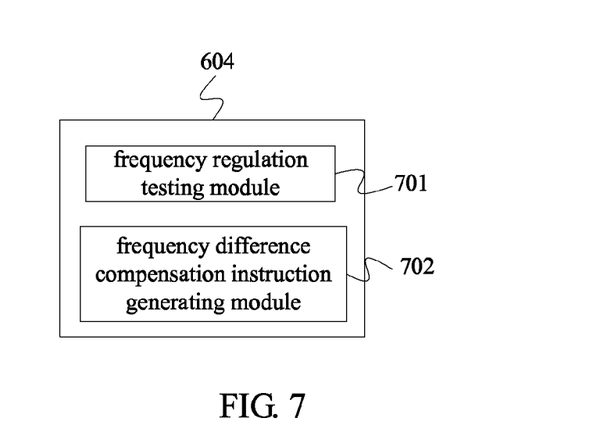
FIG. 7 is a block diagram illustrating a structure of a compensation instruction generating unit according to an embodiment of the present invention.

The compensation instruction generating unit 604 is configured to perform a frequency difference compensation operation on the frequency difference to generate a frequency difference compensation instruction. As shown in FIG. 4, the functional block 7 is a frequency difference compensation function f(x), which can be experimentally set. As shown in FIG. 7, the compensation instruction generating unit 604 comprises: a frequency regulation testing module 701 and a frequency difference compensation instruction generating module 702. The frequency regulation testing module 701 performs a primary frequency regulation test under a specific frequency difference disturbance in conditions of different rated loads to obtain a correspondence relationship curve between the frequency difference compensation instruction and the frequency difference disturbance, and the frequency difference compensation instruction generating module 702 obtains a frequency difference compensation instruction, to which the frequency difference corresponds, according to the correspondence relationship curve. An example is taken below to explain how the frequency difference compensation function f(x) is experimentally set.

When the generator set normally operates, primary frequency regulation tests are performed with frequency difference disturbances of 0.017 Hz and 0.008 Hz at 50% of the rated load, 60% of the rated load, 70% of the rated load, 80% of the rated load, 90% of the rated load, and 100% of the rated load, respectively, and a correspondence relationship between the compensation instruction and the frequency difference is obtained according to the primary frequency regulation action loads, as shown in Table 1.

The frequency difference compensation function f(x) as shown in FIG. 5 can be drawn from the correspondence relationship between the compensation instruction and the frequency difference obtained according to Table 1.

The frequency difference obtained through the dead zone process is input to the functional block 7, and a frequency difference compensation instruction, to which the frequency difference corresponds, can be obtained according to the correspondence relationship curve.

The frequency regulation action instruction outputting unit 605 is configured to combine an original primary frequency regulation output instruction with the frequency difference compensation instruction and output the result to a steam turbine speed regulation system when a selector switch is 1.

The selecting switch being 1 comprises: the power grid frequency is smaller than a difference between a rated frequency and a dead zone frequency or greater than a sum of the rated frequency and the dead zone frequency, and a delay exceeds a delay fixed value. Referring again to FIG. 4, the functional block 2 is a high/low value selector, a high value of the high/low value selector is 50.033 Hz, and a low value of the high/low value selector is 49.976 Hz. The power grid frequency signal in the functional block 1 should be input to the high/low value selector; when the grid frequency signal is greater than 50.033 Hz or smaller than 49.976 Hz, the functional block 2 outputs a logic value "1" to the functional block 3, and otherwise outputs a logic value "0" to the functional block 3.

The functional block 3 is a delay output device, whose delay fixed value is set according to dynamic characteristics of the power grid, and the present invention sets the value as 15s according to the rising time value of the power grid frequency under the actual dynamic test condition of the power grid. The output of the functional block 3 serves as a selecting switch of the functional block 9. After the functional block 3 receives the logic value "1" received by the functional block 2, if the delay exceeds 15s, the selecting switch is "1", and otherwise the selecting switch is "0".

The functional block 9 is a selective output device that selects to output "input 1" when the selecting switch is "1", and outputs the frequency difference compensation instruction to the adder 10. When the selecting switch is "0", the functional block 9 selects to output "input 2" and outputs the fixed value "0" of the fixed value module 8 to the adder 10, namely only outputs the original primary frequency regulation output instruction to the steam turbine speed regulation system.

Advantageous effects of the embodiments of the present invention are described as follows: a secondary fast release of energy storage of the generator set can be performed in the present invention, whereby it is not only possible to improve the primary frequency regulation performance of the generator set under slight grid frequency fluctuation, but also possible to effectively overcome the dead zone of the executing mechanism of the generator set without generating much additional action instructions to the generator set, and a prediction control of the generator set in participating the primary frequency regulation under slight grid frequency disturbance is realized. Moreover, the solution requires no additional equipment for realization, as it can be completed merely based on the DCS control platform of the generator set, has stronger operability and control safety, and facilitates popularized use thereof.

For most generator sets, the primary frequency regulation performance is generally decided by two factors: one is energy storage of the generator set, and the other is fast releasing capability. The typical primary frequency regulation design cannot well satisfy the primary frequency regulation performance criteria of a generator set under the condition of slight grid frequency fluctuation, whereas the claimed solution adds a primary frequency regulation fast-releasing circuit based on bang-bang control on the basis of the typical design, so that the primary frequency regulation performance of the generator set can be greatly enhanced as a whole. Taking a 600MW generator set for example, the speed and constancy of the generator set in response to the first frequency regulation are improved, and the primary frequency regulation performance of the generator set is enhanced as a whole, whereby an operational benefit of hundreds of thousands to millions yuan RMB can be gained per year in the assessments of the Two Regulations stipulated by the supervision departments of the Power Grid and the State Power.

With reference to the foregoing specific embodiments, the objects, technical solutions and advantageous effects of the present invention have been explained in detail. As should be understood, the aforementioned embodiments are merely specific embodiments of the present invention, and are not meant to limit the protection scope of the present invention, as all modifications, equivalent substitutions and improvements made within the spirits and principles of the present invention shall all fall within the protection scope of the present invention.

The invention claimed is:

1. A method for primary frequency regulation based on bang-bang control, comprising:
   obtaining in real-time a power grid frequency of a steam turbine generator set;
   performing a subtraction operation on a rated power grid frequency and said power grid frequency to generate a power grid frequency difference;
   performing a dead zone process on the power grid frequency difference according to a dead zone fixed value to generate a frequency difference;
   performing a frequency difference compensation operation on the frequency difference to generate a frequency difference compensation instruction; and
   combining an original primary frequency regulation output instruction with the frequency difference compensation instruction and outputting the result to a steam turbine speed regulation system when a selecting switch is 1.

2. The method according to claim 1, wherein the step of performing a dead zone process on the power grid frequency difference according to a dead zone fixed value comprises:
   adding the power grid frequency difference to the dead zone fixed value or subtracting the dead zone fixed value from the power grid frequency difference to generate a frequency difference.

3. The method according to claim 1, wherein the step of performing a frequency difference compensation operation on the frequency difference comprises:
   performing a primary frequency regulation test under a specific frequency difference disturbance in conditions of different rated loads to obtain a correspondence relationship curve between the frequency difference compensation instruction and the frequency difference disturbance; and
   obtaining a frequency difference compensation instruction, to which the frequency difference corresponds, according to the correspondence relationship curve.

4. The method according to claim 1, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

5. The method according to claim 2, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

6. The method according to claim 3, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

7. The method according to claim 4, wherein only the original primary frequency regulation output instruction is output to the steam turbine speed regulation system if the selecting switch is 0.

8. A device for primary frequency regulation based on bang-bang control, comprising:
   a frequency obtaining unit configured to obtain in real-time a power grid frequency of a steam turbine generator set;
   a power grid frequency difference generating unit configured to perform a subtraction operation on a rated power grid frequency and said power grid frequency to generate a power grid frequency difference;
   a dead zone processing unit configured to perform a dead zone process on the power grid frequency difference according to a dead zone fixed value to generate a frequency difference;
   a compensation instruction generating unit configured to perform a frequency difference compensation operation on the frequency difference to generate a frequency difference compensation instruction; and
   a frequency regulation action instruction outputting unit configured to combine an original primary frequency regulation output instruction with the frequency difference compensation instruction and output the result to a steam turbine speed regulation system when a selector switch is 1.

9. The device according to claim 8, wherein the dead zone processing unit is specifically configured to add the power grid frequency difference to the dead zone fixed value or subtract the dead zone fixed value from the power grid frequency difference to generate a frequency difference.

10. The device according to claim 8, wherein the compensation instruction generating unit comprises:
    a frequency regulation testing module configured to perform a primary frequency regulation test under a specific frequency difference disturbance in conditions of different rated loads to obtain a correspondence relationship curve between the frequency difference compensation instruction and the frequency difference disturbance; and
    a frequency difference compensation instruction generating module configured to obtain a frequency difference compensation instruction, to which the frequency difference corresponds, according to the correspondence relationship curve.

11. The device according to claim 8, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

12. The device according to claim 9, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

13. The device according to claim 10, wherein the selecting switch being 1 comprises: the power grid frequency is smaller than a difference between a rated frequency and a dead zone frequency or greater than a sum of the rated frequency and the dead zone frequency, and a delay exceeds a delay fixed value.

14. The device according to claim 11, wherein the frequency regulation action instruction outputting unit outputs only the original primary frequency regulation output instruction to the steam turbine speed regulation system if the selecting switch is 0.

* * * * *